United States Patent
Cloarec

(10) Patent No.: US 12,299,069 B2
(45) Date of Patent: May 13, 2025

(54) COMPUTER-IMPLEMENTED METHOD, COMPUTER PROGRAM PRODUCT AND SYSTEM FOR DATA ANALYSIS

(71) Applicant: SARTORIUS STEDIM DATA ANALYTICS AB, Umea (SE)

(72) Inventor: Olivier Cloarec, Bordeaux (FR)

(73) Assignee: SARTORIUS STEDIM DATA ANALYTICS AB, Umea (SE)

( * ) Notice: Subject to any disclaimer, the term of this patent is extended or adjusted under 35 U.S.C. 154(b) by 0 days.

(21) Appl. No.: 18/009,657

(22) PCT Filed: Jun. 9, 2021

(86) PCT No.: PCT/EP2021/065390
§ 371 (c)(1),
(2) Date: Dec. 9, 2022

(87) PCT Pub. No.: WO2021/250057
PCT Pub. Date: Dec. 16, 2021

(65) Prior Publication Data
US 2023/0196720 A1 Jun. 22, 2023

(30) Foreign Application Priority Data
Jun. 12, 2020 (EP) .................................. 20290050

(51) Int. Cl.
*G06F 18/15* (2023.01)
*G01N 15/10* (2024.01)
(Continued)

(52) U.S. Cl.
CPC ......... *G06F 18/15* (2023.01); *G01N 15/1429* (2013.01); *G06V 10/34* (2022.01);
(Continued)

(58) Field of Classification Search
CPC ...... G06F 18/15; G06F 17/18; G01N 15/1429
See application file for complete search history.

(56) References Cited

U.S. PATENT DOCUMENTS 6,134,354 A 10/2000 Lee et al.
2006/0002608 A1 1/2006 Haddon et al.
(Continued)

FOREIGN PATENT DOCUMENTS

CN 104781649 7/2015

OTHER PUBLICATIONS

Overton, "Modified Histogram Subtraction Technique for Analysis of Flow Cytometry Data" Cytometry 9:619-626 (1988) (Year: 1988).*

(Continued)

*Primary Examiner* — John C Kuan
(74) *Attorney, Agent, or Firm* — Klarquist Sparkman, LLP

(57) ABSTRACT

A computer-implemented method for data analysis comprises obtaining a plurality of first observations, each one of the plurality of first observations including one or more values of one or more first parameters, the plurality of first observations grouped into a plurality of groups; constructing a first histogram using the values of at least one of the one or more first parameters, included in the plurality of first observations; constructing, for each one of the plurality of groups, a second histogram having bins corresponding to bins of the first histogram, wherein each one of the bins of the second histogram includes a count of the first observations, among the first observations that belong to the one of the plurality of groups, having one or more values corresponding to the one of the bins for the at least one of the one or more first parameters; and outputting the second histograms.

6 Claims, 13 Drawing Sheets

(51) Int. Cl.
    *G01N 15/1429*     (2024.01)
    *G06F 17/18*     (2006.01)
    *G06V 10/34*     (2022.01)
    *G06V 10/50*     (2022.01)
    *G06V 20/69*     (2022.01)

(52) U.S. Cl.
    CPC ............ *G06V 10/50* (2022.01); *G06V 20/695* (2022.01); *G01N 2015/1006* (2013.01); *G06F 17/18* (2013.01)

(56) References Cited

U.S. PATENT DOCUMENTS

| | | |
|---|---|---|
| 2015/0104786 A1 | 4/2015 | Shirasuna et al. |
| 2015/0117745 A1 | 4/2015 | Vapa et al. |
| 2018/0018386 A1* | 1/2018 | Orlova ................ G06F 3/04847 |
| 2018/0025212 A1 | 1/2018 | Ajemba et al. |
| 2018/0247715 A1* | 8/2018 | Kumar .................. G06N 3/045 |
| 2018/0340890 A1* | 11/2018 | Roederer ........... G01N 21/6486 |
| 2019/0085324 A1 | 3/2019 | Regev et al. |
| 2020/0160032 A1 | 5/2020 | Allen et al. |

OTHER PUBLICATIONS

Bernas et al., "Quadratic Form: A Robust Metric for Quantitative Comparison of Flow Cytometric Histograms" Cytometry Part A, 73A: 715-726, 2008 (Year: 2008).*

Office Action received in counterpart Chinese Patent Application No. 202180042122.5, dated Aug. 25, 2023, 8 pages (no English translation).

Zaunders et al., "Computationally Efficient Multidimensional Analysis of Complex Flow Cytometry Data Using Second Order Polynomial Histograms," Cytometry Part A, 89A, 2016, pp. 44-58.

International Search Report received in PCT/EP2021/065390, mailed Sep. 7, 2021, 4 pages.

Written Opinion, received in PCT/EP2021/065390, mailed Sep. 7, 2021, 12 pages.

European Search Report received in EP 20290050, Nov. 12, 2020, 3 pages.

* cited by examiner

COMPUTER-IMPLEMENTED METHOD, COMPUTER PROGRAM PRODUCT AND SYSTEM FOR DATA ANALYSIS

CROSS REFERENCE TO RELATED APPLICATIONS

This is the U.S. National Stage of International Application No. PCT/EP2021/065390 filed Jun. 9, 2021, which was published in English under PCT Article 21 (2), which in turn claims the benefit of European Application No. 20290050.2, filed Jun. 12, 2020. Both applications are hereby incorporated herein in their entirety by reference.

This application relates to a computer-implemented method, a computer program product and a system for data analysis.

BACKGROUND

When analyzing dataset including many observations with measurements of one or more parameters, a statistical distribution of the observations with respect to the one or more parameters may be used. The shape of the distribution may provide more information than statistical summaries such as a mean and a standard deviation as well as a median and its quartile.

SUMMARY

According to an aspect, the problem relates to facilitating analysis of multivariate data, in particular, data including observations that may be grouped into a plurality of groups.

This problem is solved by the features disclosed by the independent claims. Further exemplary embodiments are defined by the dependent claims.

According to an aspect, a computer-implemented method is provided for data analysis. The method comprises:
  obtaining a plurality of first observations, each one of the plurality of first observations including one or more values of one or more first parameters, the plurality of first observations being grouped into a plurality of groups;
  constructing a first histogram using the values of at least one of the one or more first parameters, included in the plurality of first observations;
  constructing, for each one of the plurality of groups, a second histogram having bins corresponding to bins of the first histogram, wherein each one of the bins of the second histogram includes a count of the first observations, among the first observations that belong to the one of the plurality of groups, having one or more values corresponding to the one of the bins for the at least one of the one or more first parameters; and
  outputting the second histograms constructed for the plurality of groups.

In the present disclosure, an "observation" may be understood as a set of values. The set of values may include one or more values measured during an experiment and/or one or more values derived from a result of the experiment. The experiment may be a physical, chemical and/or biological experiment. In the present disclosure, the "first observations" may be referred to as "primary observations".

Further, in the present disclosure, each of the "one or more first parameters" may be a parameter, a value of which can be measured during an experiment or derived from a result of the experiment. For example, values of the "one or more first parameters" may be measured by an instrument that generates data with respect to an experiment. In the present disclosure, the "first parameters" may be referred to as "primary variables".

In the present disclosure, the "first histogram" may be referred to as a "master histogram". In some exemplary embodiments, the "first histogram" may be a 1-dimensional (1D) histogram for one of the one or more first parameters. In some other exemplary embodiments, the "first histogram" may be a 2-dimensional (2D) histogram for two of the one or more first parameters.

In some circumstances, the method according to the above-stated aspect may facilitate analysis of multivariate data. More specifically, for example, the method according to the above-stated aspect may allow accurate extraction of characteristics of the first observations belonging to different groups.

In various embodiments and examples described herein, the plurality of groups may correspond to different sets of conditions under which the plurality of first observations are obtained and the first observations belonging to a same one of the plurality of groups have been obtained under a same one of the different sets of conditions. Accordingly, in such a case, the second histograms constructed for the plurality of groups may represent characteristics of the different sets of conditions.

Further, in the method according to any one of the above-stated aspect and various embodiments thereof, the values of the one or more first parameters included in the plurality of first observations may be obtained by performing a dimension reduction process on initial observations corresponding to the plurality of first observations, each one of the initial observations including values of a plurality of initial parameters, wherein the number of the plurality of initial parameters is greater than the number of the one or more first parameters.

The dimension reduction process may be principal component analysis.

In some circumstances, the dimension reduction process may contribute to faster processing of the initial observations.

In the present disclosure, the "initial observations" may also be referred to as "primary observations" and the "initial parameters" may also be referred to as "primary variables".

Further, the method according to any one of the above-stated aspect and various embodiments thereof may further comprise:
  performing a data analysis process on a data set representing the second histograms as second observations, wherein each one of the second observations corresponds to one of the second histograms and has the count of each bin of the one of the second histograms as a value of a second parameter.

In the present disclosure, a "second parameter" may correspond to localization of a histogram bin on a scale or scales of the first parameter(s) for which the first histogram is/are constructed. For example, in case the first histogram is a 2D histogram, the second parameters may correspond to coordinates of bins of the 2D, first histogram.

In the present disclosure, the "second parameter" may be referred to as a "secondary variable" and the "second observation" may be referred to as a "secondary observation".

In some exemplary embodiments where the dimension reduction process is performed on the initial observations as mentioned above, the initial observations may be obtained by performing a flow cytometry experiment. In such exemplary embodiments, each one of the initial observations may correspond to a cell or a particle observed during the flow cytometry experiment. Further, the plurality of initial parameters may include forward-scattered light, side-scattered light and/or at least one fluorescence signal that can be measured during the flow cytometry experiment. For example, the at least one fluorescence signal may be obtained from at least one fluorescence channel measuring at least one fluorescent tag added to a biological assay subject to the experiment. Further, the plurality of groups may relate to different sets of experimental conditions under which the initial observations have been obtained and the first observations belonging to a same one of the plurality of groups may correspond to the initial observations obtained under a same one of the different sets of experimental conditions.

In the exemplary embodiments where the initial observations are obtained by performing a flow cytometry experiment, the method may further comprise:

performing a data analysis process on a data set representing the constructed second histograms as second observations, wherein each one of the second observations corresponds to one of the second histograms and has the count of each bin of the one of the second histograms as a value of a second parameter, wherein the data analysis process may be a partial least squares discriminant analysis; and determining, according to a result of the data analysis process, one or more second parameters that can indicate existence of one or more living cells.

Such exemplary embodiments may facilitate faster and/or more accurate determination of living cells from results of a flow cytometry experiment.

In some exemplary embodiments where the dimension reduction process is performed on the initial observations as mentioned above, the initial observations may be obtained by performing an automated cell segmentation method on microscopic images of cells. In such exemplary embodiments, each one of the initial observations may correspond to an object identified as a cell while performing the automated cell segmentation method. Further, the plurality of initial parameters may include morphological measurements carried out on the microscopic images while performing the automated cell segmentation method. Examples of the morphological measurements may include, but are not limited to, area, perimeter, circularity, solidity, feret (e.g., "Feret diameter", which may also be referred to as "caliper diameter"), etc. Further, each one of the plurality of groups may correspond to one of the microscopic images and the first observations belonging to a same one of the plurality of groups may correspond to the initial observations that have been obtained from a same one of the microscopic images.

Such exemplary embodiments may facilitate identification of microscopic images that represent most distinctively biological variations in an experiment for which the microscopic images have been captured.

According to another aspect, a computer program product is provided. The computer program product comprises computer-readable instructions that, when loaded and run on a computer, cause the computer to perform the method according to any one of the above-stated aspect and various embodiments thereof.

According to yet another aspect, a system is provided for data analysis. The system comprises:
    a storage medium; and
    a processor configured to:
        obtain a plurality of first observations, each one of the plurality of first observations including one or more values of one or more first parameters, the plurality of first observations being grouped into a plurality of groups;
        construct a first histogram using the values of at least one of the one or more first parameters, included in the plurality of first observations;
        construct, for each one of the plurality of groups, a second histogram having bins corresponding to bins of the first histogram, wherein each one of the bins of the second histogram includes a count of the first observations, among the first observations that belong to the one of the plurality of groups, having one or more values corresponding to the one of the bins for the at least one of the one or more first parameters; and
        store, in the storage medium, the second histograms constructed for the plurality of groups.

In the system according to the above-stated aspect, the values of the one or more first parameters included in the plurality of first observations may be obtained by performing a dimension reduction process on initial observations corresponding to the plurality of first observations, each one of the initial observations including values of a plurality of initial parameters, wherein the number of the plurality of initial parameters is greater than the number of the one or more first parameters, and wherein the dimension reduction process may be principal component analysis.

Further, in the system according to any one of the above-stated aspect and various embodiments thereof, the processor may be further configured to:

perform a data analysis process on a data set representing the second histograms as second observations, wherein each one of the second observations corresponds to one of the second histograms and has the count of each bin of the one of the second histograms as a value of a second parameter.

Further, in some exemplary embodiments of the system where the dimension reduction process is performed on the initial observations, the initial observations may be obtained by performing a flow cytometry experiment. In such exemplary embodiments, each one of the initial observations may correspond to a cell or a particle observed during the flow cytometry experiment. Further, the plurality of initial parameters may include forward-scattered light, side-scattered light and/or at least one fluorescence signal that can be measured during the flow cytometry experiment. Further, the plurality of groups may relate to different sets of experimental conditions under which the initial observations have been obtained and the first observations belonging to a same one of the plurality of groups may correspond to the initial observations obtained under a same one of the different sets of experimental conditions.

In the exemplary embodiments of the system where the initial observations are obtained by performing a flow cytometry experiment, the processor may be further configured to:

perform a data analysis process on a data set representing the constructed second histograms as second observations, wherein each one of the second observations corresponds to one of the second histograms and has the count of each bin of the one of the second histograms as a value of a second parameter, wherein the data analysis process may be a partial least squares discriminant analysis; and determine, according to a result of the data analysis process, one or more second parameters that can indicate existence of one or more living cells.

Further, in some exemplary embodiments of the system where the dimension reduction process is performed on the initial observations, the initial observations may be obtained by performing an automated cell segmentation method on microscopic images of cells. In such exemplary embodiments, each one of the initial observations may correspond to an object identified as a cell while performing the automated cell segmentation method. Further, the plurality of initial parameters may include morphological measurements carried out on the microscopic images while performing the automated cell segmentation method. Further, each one of the plurality of groups may correspond to one of the microscopic images and the first observations belonging to a same one of the plurality of groups may correspond to the initial observations that have been obtained from a same one of the microscopic images.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. In some examples, the system may be a general purpose computer system. In other examples, the system may be a special purpose computer system including an embedded system.

In some circumstances, any one of the above stated aspects as well as any one of various embodiments and examples described herein may provide one or more of the following advantages:
- facilitating analysis of data including observations that can be grouped into a plurality of groups;
- enabling accurate and/or fast extraction of characteristics of observations belonging to different groups, e.g., groups relating to different sets of conditions under which the observations have been obtained;
- in case the data to be analyzed is obtained with a flow cytometry experiment, facilitating faster and/or more accurate determination of living cells from results of the flow cytometry experiment;
- in case the data to be analyzed is obtained with automatic cell segmentation, facilitating identification of microscopic images that represent most distinctively biological variations in an experiment for which the microscopic images have been captured.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION OF EMBODIMENTS

Figure 1:
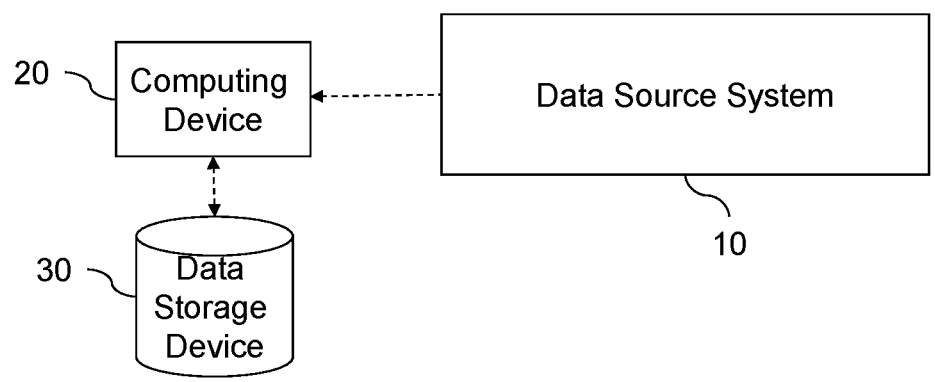
FIG. 1 shows a schematic diagram of an exemplary system for data analysis.

In the following text, a detailed description of examples will be given with reference to the drawings. It should be understood that various modifications to the examples may be made. In particular, one or more elements of one example may be combined and used in other examples to form new examples.

When measuring one or more parameters (in particular, many parameters) on many different objects (e.g., objects that are subject to biological experiments), a statistical distribution of such measurement may be very informative. The shape of the distribution may provide much more information than statistical summaries such as a mean and a standard deviation as well as a median and its quartile. For example, the statistical distribution can also show subpopulations of objects when the distribution is multimodal. If enough observations of such objects are obtained, subgroup of objects corresponding to different types of objects can also be obtained and their distribution can be compared. Hence, comparisons based on the whole distribution rather than based on simple statistics such as mean, standard deviation can also be possible. This may have the potential to reveal features not commonly found with summary statistics.

As specific examples of measurements where many parameters are measured on many different objects, flow cytometry and automated cell segmentation will be referred to in the present disclosure.

Flow cytometry is a technique used to measure physical and chemical characteristics of a population of cells or particles. A sample containing cells or particles may be suspended in a fluid and injected into a flow cytometer instrument. The sample may be focused to (ideally) flow one cell or particle at a time through a laser beam and the light scattered may be characteristic to the cells or particles and their components. The cells or particles can also be labelled with fluorescent markers so that light is first absorbed and then emitted in a band of wavelengths. With such an instrument, it may be possible to measure many parameters on tens of thousands of cells (or particles) very quickly. The data obtained for each flow cytometry measurement may be in the form of a table. Each row may correspond to one event (e.g., a cell or a particle) and each column may correspond to a characteristic of the event measured with laser beams.

Automated cell segmentation methods from confocal microscope images is a way of measuring characteristics of cells from all (or part of) the cells observed in microscopic images. The data resulting from such image processing may also be in the form of a table. Each row may correspond to a segmented object (a cell or an object considered as a cell by the segmentation method) and contain characteristics of the segmented object. Further, each column may correspond to a characteristic measured on each object.

The data structure of both flow cytometry and automated cell segmentation may be identical. Data from flow cytometry and cell segmentation may both comprise thousands of objects and many different measures for each of these objects, for example. Accordingly, the same methodology can be applied to analyze both types of data.

It should be noted that flow cytometry and automated cell segmentation are referred to in the present disclosure merely as examples and that various aspects and embodiments described herein may be applied also to data obtained with measurements other than flow cytometry and automated cell segmentation.

System Configuration

FIG. 1 shows a schematic diagram of an exemplary system for data analysis. The exemplary system shown in FIG. 1 comprises a data source system 10, a computing device 20 and a data storage device 30.

The data source system 10 may be a system that generates and/or collect data to be analyzed. Further, the data source device 10 may be configured to provide the computing device 20 with the data to be analyzed.

The data source system 10 may comprise a device (e.g., a computer) for collecting data with respect to an experiment, for example. Further, the data source system 10 may include or be connected to a setup for carrying out the experiment. The data with respect to the experiment may include, for example, a plurality of observations obtained with the experiment. Each observation may be a set of values including one or more values measured during an experiment for one or more parameters and/or one or more values derived from a result of the experiment for one or more parameters. Further, the data source system 10 may provide the computing device 20 with information indicating different sets of conditions (e.g., experimental conditions) under which observations included in the data are obtained, in addition to the data itself. The observations may be grouped into a plurality of groups according to the different sets of conditions. More specifically, the observations may be grouped into the plurality of groups such that the observations belonging to a same one of the plurality of groups have been obtained under a same one of the different sets of conditions.

In some exemplary embodiments, the data source system 10 may comprise a flow cytometer that is configured to perform flow cytometry and to collect data from samples that undergo flow cytometry. The data collected by the data source system 10 comprising the flow cytometer may include, for instance, a plurality of observations corresponding to cells or particles in one or more samples processed by the flow cytometer. Each observation may include one or more values of one or more parameters that may be measured in a flow cytometry experiment. The examples of the one or more parameters may include, but are not limited to, forward-scattered light (FSC), side-scattered light (SSC) and/or at least one fluorescence signal that can be measured during the flow cytometry experiment (e.g., a measured signal for a fluorescent tag added to a biological assay).

In some other exemplary embodiments, the source data system 10 may comprise a system for performing an automated cell segmentation method. In such exemplary embodiments, the source data system 10 may comprise a computer configured to perform image processing on microscopic images of cells. In some circumstances, the source data system 10 may further comprise a microscopic imaging device that capture the microscopic images of cells to be processed, in addition to the computer configured to perform the image processing. In these exemplary embodiments, the source data system 10 may generate data to be provided to the computing device 20 by measuring characteristics of cells from the cells in the microscopic images. The generated data may include a plurality of observations corresponding to objects that are identified as cells while performing the automated cell segmentation method. Each observation included in the data may include one or more values measured for one or more parameters that include morphological characteristics such as area, perimeter, circularity, solidity, feret, etc.

The computing device 20 may be a computer connected to the data source system 10 via (a) wired and/or wireless communication network(s). The computing device 20 may obtain data to be analyzed from the data source system 10. For example, the computing device 20 may receive data including observations each of which includes one or more values of one or more parameters. The computing device 20 may further receive information indicating different sets of conditions under which the observations are obtained. The computing device 20 may be configured to perform a method according to various embodiments and examples described herein. The data storage device 30 may store information that is used by the computing device 20 and/or information that is generated by the computing device 20.

It is noted that the data source system 10, the computing device 20 and the data storage device 30 may either be incorporated into a single device with one body or implemented with more than one separate devices. Further, the computing device 20 may be implemented with more than one computer connected to each other via (a) wired and/or wireless communication network(s).

Exemplary Process Flow

An exemplary process performed by the system shown in FIG. 1 will be described below. The following provides definitions and explanations of some terms that are used for describing the exemplary process.

Primary Variables

Primary variables may be parameters that have been measured by an instrument (e.g., included or connected to the data source system 10 shown in FIG. 1) generating and/or collecting the data to be analyzed.

In case the data source system 10 comprises a flow cytometer, for example, the primary variables may be the parameters measured on each cell or particle passing through detector lasers. Accordingly, parameters such as FSC, SSC and/or one or more fluorescence signal that can be measured during the flow cytometry experiment as mentioned above may be considered as the primary variables.

In case the data source system 10 comprises a system for automatic cell segmentation, for example, the primary variables may be the morphological measurements carried out on cell microscopic images. Specifically, for each cell in the microscopic images, parameters that are related to a shape of the cell may be measured. Accordingly, parameters such as area, perimeter, circularity, solidity, feret, etc.

In the present disclosure, a "primary variable" may also be referred to as a "first parameter".

Further, as will be explained in more detail below, in some exemplary embodiments, a dimension reduction process may be performed on observations that include values of the primary variables. In such cases, one or more new variables (in other words, parameters) may be obtained as a result of the dimension reduction and the one or more new variables may replace the original variables in the description of the observations (e.g., first observations). Here, the "original variables" may indicate the primary variables, the values of which are included in the observations before performing the dimension reduction process. The "original variables" may also be referred to as the "initial parameters" in the present disclosure. In the present disclosure, such new variables obtained by the dimension reduction process may also be considered as the "primary variables" since each calculated value of these new variables (e.g., parameters) corresponds to a single observation (e.g., a single primary observation) that includes the values of the original variables.

Primary Observations

Primary observations may correspond to items (in other words, objects) on which the primary variables have been measured. Each of the primary observations may include values of the primary variables for the corresponding item. In the exemplary embodiments where the data source system 10 comprises a flow cytometer, each of the primary observations may correspond to a single particle or cell which undergo a flow cytometry experiment. For flow cytometry, these observations may also be often referred to as "events". In the exemplary embodiments where the data source system 10 comprises a system for automatic cell segmentation, each of the primary observations may correspond to an object considered as a cell in the automatic cell segmentation method.

The primary observations can be grouped into groups of observations corresponding to different experimental conditions or replicates. For example, in the case of flow cytometry, the primary observations obtained from a single biological sample contained in a single well of a well plate may form such a group of primary observations. Further, for example, in the case of automatic cell segmentation, the primary observations obtained from a single microscopic image may form such a group of primary observations.

Primary Dataset

A primary dataset may be formed by a combination of the primary variables and the primary observations. In some aspects, the primary dataset may comprise the primary observations including the values of the primary variables. Accordingly, the primary dataset may comprise the instrument measurements for each primary observation. In case a dimension reduction process is performed on the measured values of the original primary variables (e.g., initial parameters), the primary dataset may comprise values of the new variables (also considered as the "primary variables") for each primary observation.

Secondary Variables

Secondary variables may be new parameters obtained from a master histogram constructed using the primary dataset, as will be described below in detail. The secondary variables may correspond to the localization of bins of the master histogram, on the scale of the primary variable(s). In case the master histogram relates to two parameters, in other words, in case the master histogram is a 2-dimensional histogram, the secondary variables may correspond to the coordinates of the bins on the 2-D histogram.

Secondary Observations

As stated above, the primary observations may be grouped into groups of observations corresponding to different experimental conditions or replicates. For each group of primary observations, a second histogram may be constructed using the bins of the master histogram (e.g., the secondary variables). Each bin of the second histogram may have a value indicating a count of the primary observations that belong to the same group and that have the value(s) corresponding to the bin for the primary variable(s). A secondary observation may comprise the sizes (e.g., values) of the bins of the second histogram. In other words, a second histogram corresponding to one group of primary observations may be considered as a secondary observation. A single secondary observation from a group of primary observations may be characterized by the values of the bins (e.g., secondary variables). Each secondary observation may be characterized by the same set of secondary variables as all other secondary observations.

Secondary Dataset

A secondary dataset may be formed by a combination of the secondary variables and the secondary observations.

Figure 2:
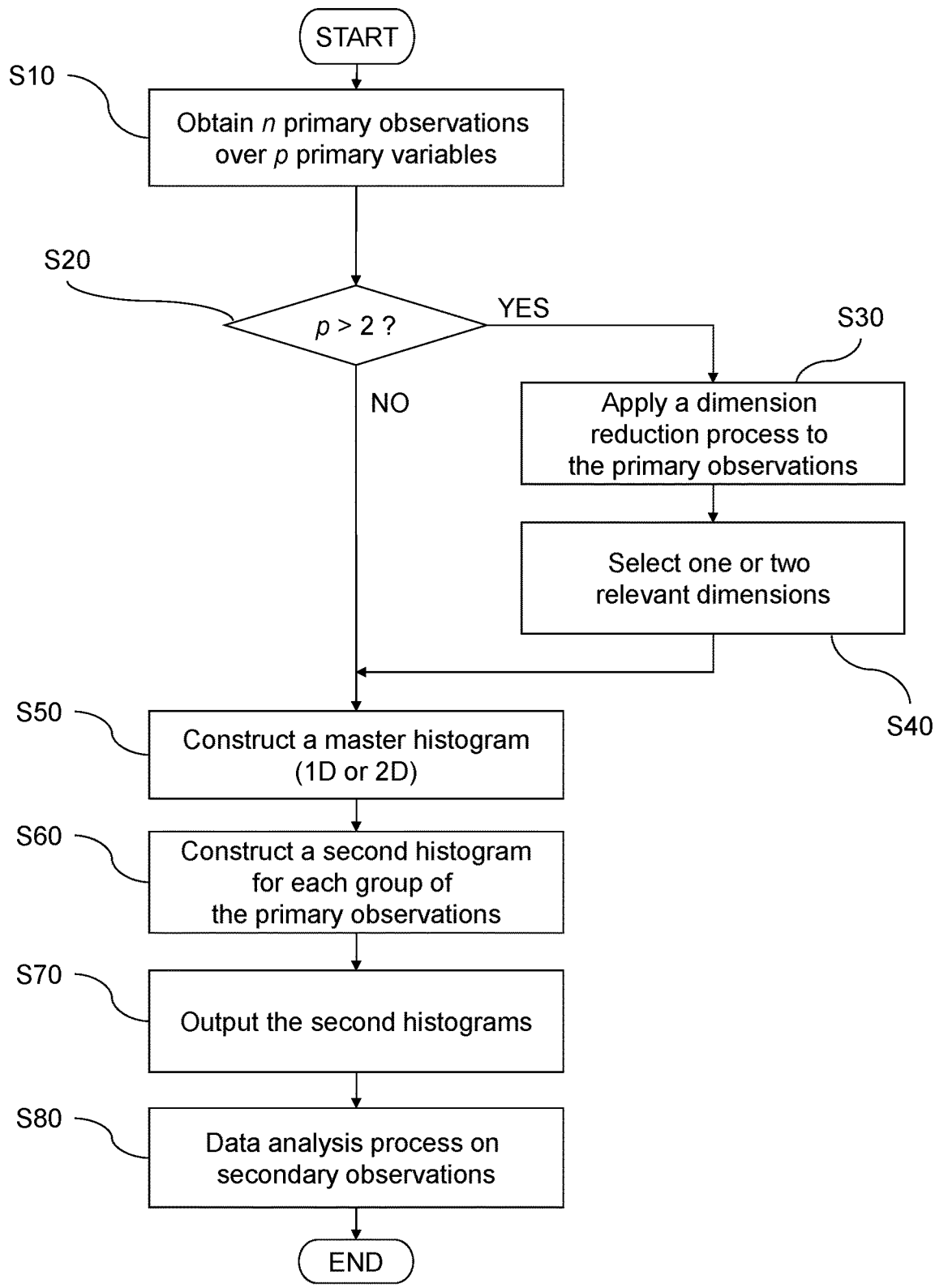
FIG. 2 shows a flowchart of an exemplary process performed by the system shown in FIG. 1.

FIG. 2 shows a flowchart of an exemplary process performed by the system shown in FIG. 1. The exemplary process may be performed by the computing device 20 shown in FIG. 1. The exemplary process may start, for example, when the computing device 20 receives, via an input device (not shown), an instruction from a user to start the exemplary process.

In step S10, the computing device 20 may obtain, from the data source system 10, a primary dataset comprising n primary observations over p primary variables. After step S10, the process may proceed to step S20. In some exemplary embodiments, the computing device 20 may further obtain, from the data source system 10, information indicating different sets of conditions under which the primary observations are obtained. As also stated above, the n primary observations may be grouped into a plurality of groups such that the primary observations belonging to the same group have been obtained under the same set of conditions.

In step S20, the computing device 20 may determine whether or not the number p of the primary variables of the obtained primary dataset exceeds two. If the number p of the primary variables is more than two (YES in step S20), the process may proceed to step S30 for performing a dimension reduction process. If the number p of the primary variables is one or two (NO in step S20), on the other hand, the process may proceed to construction of a master histogram in step S50.

In step S30, the computing device 20 may apply a dimension reduction process to the primary dataset obtained in step S10. In some exemplary embodiments, the dimension reduction process may be principal component analysis. By applying the dimension reduction process, the number of the primary variables can be reduced, and a new set of primary variables may be obtained for constructing the master histogram in step S50. After step S30, the process may proceed to step S40.

In step S40, the computing device 20 may select one or two relevant dimensions from the new set of primary variables constructed from the initial primary variables and/or amongst the initial primary variables. The newly constructed primary variables may be obtained as a result of applying the dimension reduction process in step S30. In other words, one or two primary variables may be selected, from among the newly constructed primary variables and/or the initial primary variables, for use in constructing a master histogram. In case of performing the principal component analysis as the dimension reduction process, for instance, the first one or two principal components that are newly built primary variables as linear combination of the initial primary variables may be selected. The selection of the primary variables can be performed automatically through an optimization process related to the final output of the whole workflow or according to any criteria that are implemented from the domain knowledge that is at the origin of the measurements.

After determining NO in step S20 or performing step S40, the process may proceed to step S50.

In step S50, the computing device 20 may construct a master histogram. Because of the determination in step S20 as well as the dimension reduction process and the selection of relevant dimensions, at step S50, the primary observations include values for one or two primary variables. The master histogram may be constructed for the primary observations with respect to the one or two primary variables. In case of one primary variable, the master histogram will be a 1D histogram. In case of two primary variables, the master histogram will be a 2D histogram.

Figure 3:
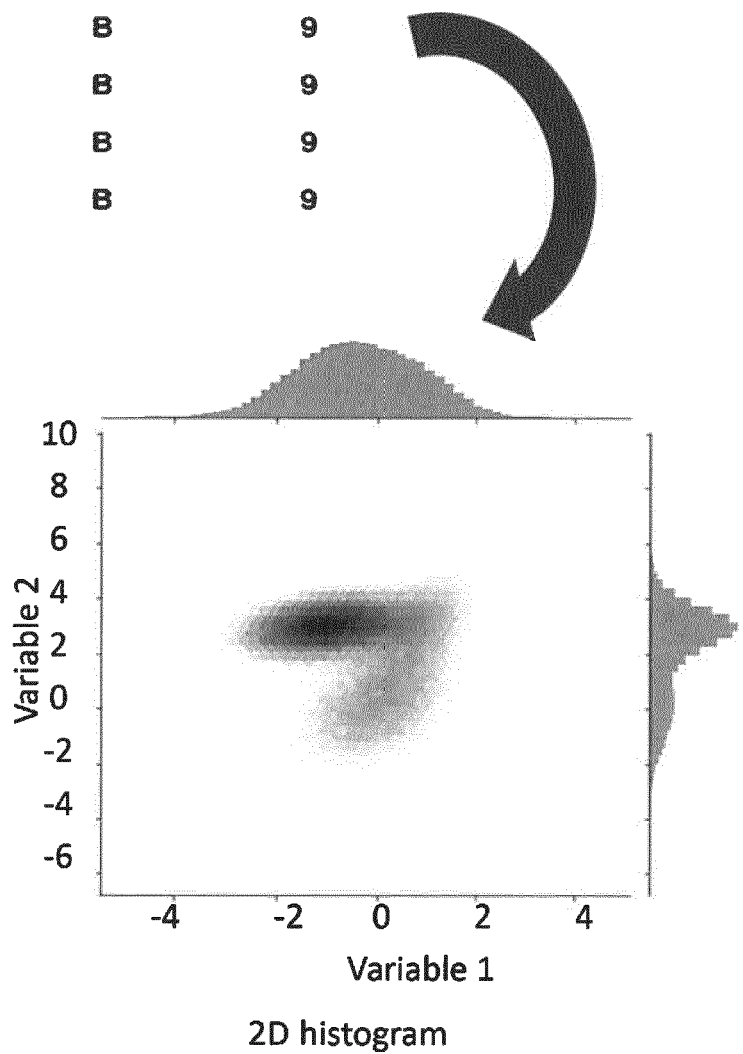
FIG. 3 shows exemplary primary observations and an exemplary 2D master histogram.

FIG. 3 shows exemplary primary observations and an exemplary 2D master histogram that may be constructed in step S50 of FIG. 2. Referring to FIG. 3, the table on the left shows exemplary primary dataset and the 2D histogram on the right shows an exemplary master histogram constructed using the exemplary primary dataset.

The exemplary primary dataset shown in FIG. 3 is an artificial dataset that has been generated from three bivariate normal distributions. This particular exemplary primary dataset represents the result of a hypothetical experiment that contains two experimental settings, A and B. The two groups A and B differ on the population size sampled from two of the three distributions. Each of the groups A and B is divided into 10 subgroups representing replicates in the context of this hypothetical experiment.

The 10 subgroups may be understood as statistical units that are to be compared by constructing the second histograms. Thus, the 10 subgroups may also be considered as "observations" corresponding to the statistical units to be compared. Each row of the table shown in FIG. 3 corresponds to a primary observation. As can be seen from the table shown in FIG. 3, each primary observation in this particular example comprises values of two primary variables, variable 1 and variable 2. Further, the exemplary primary dataset shown in FIG. 3 comprises 180,000 primary observations.

Using the exemplary primary dataset shown in FIG. 3, a master histogram can be constructed from all the primary observations (e.g., 180,000 observations) and all the primary variables (e.g., variables 1 and 2) of the hypothetical experiment. Since the exemplary primary dataset shown in FIG. 3 has only two variables per primary observation, a dimension reduction process will not be performed in case of processing the exemplary primary dataset according to the exemplary process shown in FIG. 2 (in other words, it will be determined NO in step S20 and the process will proceed to the master histogram construction in step S50). The 2D histogram shown in FIG. 3 on the right is an exemplary representation of the master histogram constructed using all the primary observations included in the exemplary primary dataset shown in the table of FIG. 3.

Referring again to FIG. 2, after step S50, the process may proceed to step S60.

In step S60, the computing device 20 may construct, for each group of primary observations, a second histogram having bins corresponding to the bins of the master histogram. Each bin of the second histogram may include a count of the primary observations, among the primary observations that belong to the same group, having one or two values corresponding to the one of the bins for the one or two primary variables for which the master histogram has been constructed. As also stated above, each bin of the second histogram may be considered as a secondary variable and may correspond to the localization of a bin of the master histogram, on the scale of the primary variable(s). Further, as also stated above, the second histograms constructed for different groups of primary observations may be considered as secondary observations.

For instance, referring to the specific example shown in FIG. 3, the bins of the 2D master histogram on the right may be considered as the secondary variables. Further, the bins of the 2D master histogram may be used as a new array of variable IDs. Once the reference bins of the master histogram (in other words, the secondary variables) have been generated, a set of second histograms corresponding to the different experimental conditions can be constructed as stated above with reference to step S60 of FIG. 2. In this specific example, a second histogram corresponding to each of the 10 subgroups (e.g., observations in the sense of statistical units to be compared) in groups A and B may be constructed, resulting in 20 second histograms. Each second histogram may have exactly the same bins definition and can, therefore, be compared between the second histograms (in other words, the secondary observations). The resulting dataset may be considered as a secondary dataset which is a new multivariate dataset, where each secondary observation and secondary variable correspond to a second histogram and a bin localization, respectively.

Referring again to FIG. 2, after step S60, the process may proceed to step S70.

In step S70, the computing device 20 may output the second histograms constructed for different groups of primary variables in step S60. For example, the computing device 20 may store the second histograms in the data storage device 30. Additionally or alternatively, the computing device 20 may display the second histograms on a display device (not shown) of the computing device 20.

Figure 4:
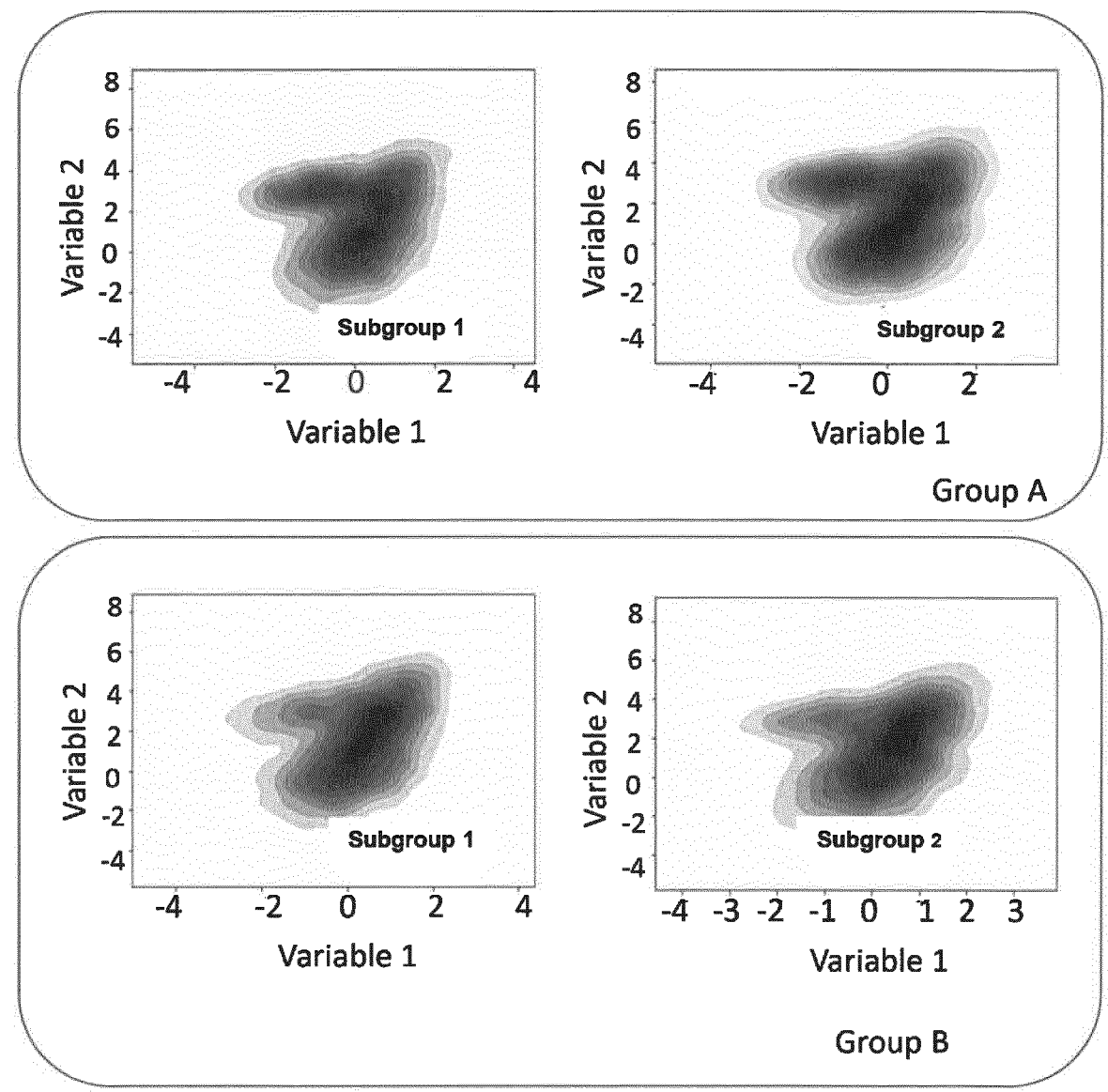
FIG. 4 shows contour plots of exemplary secondary observations.

The second histograms may be presented (e.g., on a display device) as such or after smoothing. For example, FIG. 4 shows contour plots of exemplary smoothed histograms for some of the secondary observations obtained from the exemplary primary dataset shown in FIG. 3. In FIG. 4, the data are grouped by secondary observations corresponding to two groups A and B of the hypothetical experiment as mentioned above with reference to FIG. 3.

Referring again to FIG. 2, after step S70, the process may proceed to step S80.

In step S80, the computing device 20 may perform a data analysis process on the second histograms, in other words, on the secondary observations. Examples of the data analysis process may include, but are not limited to, pattern recognition, multivariate regression, multivariate time series analysis, etc.

By performing steps S10 to S70 of the exemplary process, a large set of primary observations, multivariate or not, obtained in different contexts (e.g., experimental conditions) can be transformed into a new multivariate dataset, in other words, secondary dataset. In the secondary dataset, the secondary observations and the secondary variables may correspond to the different contexts and the bins of the master histogram constructed from the whole set of the primary observations, respectively.

Accordingly, a group of primary observations, after being summarised using the master and second histograms and then transformed into a secondary observation, may be treated in a same way as spectrum since the secondary observation may be understood as following a well-known structure of spectrum data. As also mentioned above, the secondary observation may have a set of variables corresponding to a position on a parameter scale and a set of intensities corresponding to positions on the parameter scale. Thus, in some exemplary embodiments, spectroscopic data analysis methods and/or multivariate data analysis in particular may be used to analyse these sets of second histograms in step S80 of FIG. 2. Histograms can be multidimensional according to the number of channels describing the events.

The second histograms may also be represented by a curve, which may be obtained directly from methods such as kernel density estimation. Hence, there may be a strong analogy between multivariate dataset based on the second histograms and data obtained from spectrometric methods. Accordingly, in some exemplary embodiments, it may also be possible to apply, on the second histograms, methods such as curve smoothing techniques commonly used in the spectrometry data processing in step S80 of FIG. 2. Although the data analysis that follows may vary according to the application, its workflow may be similar to application existing already in spectroscopy and other multivariate data analysis.

Figure 5A:
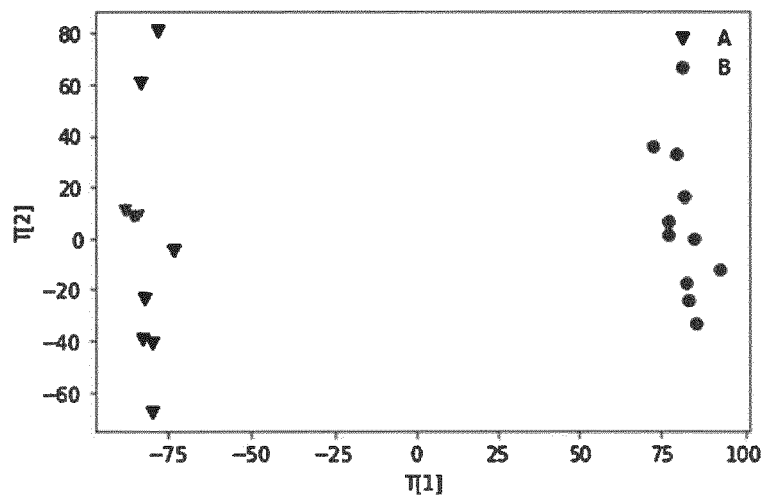
FIG. 5A shows scores of two first principal components obtained as result of multivariate data analysis on the exemplary secondary observations.
Figure 5B:
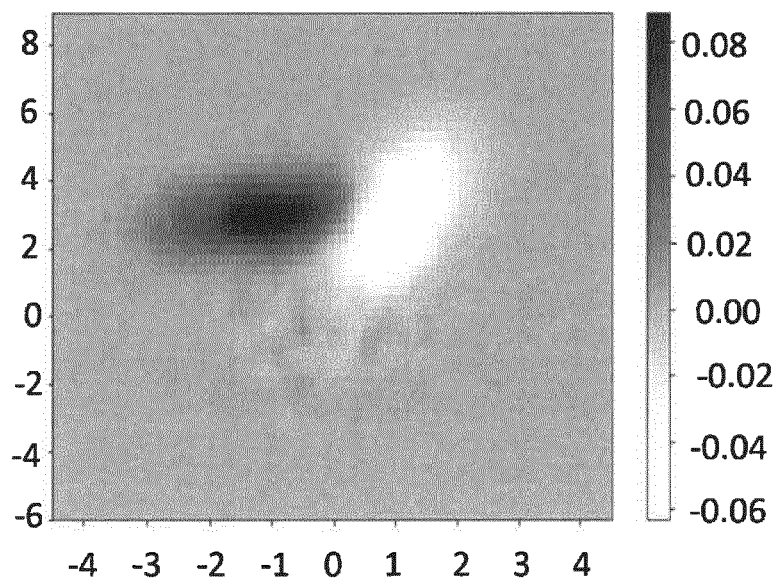
FIG. 5B shows loadings resulting from the multivariate data analysis on the exemplary secondary observations shown in the format of the exemplary 2D master histogram shown in FIG. 3.

As a specific example of the data analysis process performed on the secondary dataset in step S80 of FIG. 2, a multivariate pattern recognition using principal component analysis (PCA) was performed on the exemplary secondary observations mentioned above with reference to FIGS. 3 and 4. FIG. 5A shows scores of two first principal components obtained as result of multivariate data analysis on the exemplary secondary observations. As also mentioned above, each of the exemplary secondary observations (in other words, second histograms) corresponds to one subgroup of either group A or B. Accordingly, each element of FIG. 5A representing a secondary observation corresponds to a subgroup of group A or B. As can be seen from FIG. 5A, the scores of the first principal component shows a strong difference between group A and group B. FIG. 5B shows the loadings of PCA on the exemplary secondary dataset in the 2-dimensional format of the exemplary master histogram shown in FIG. 3 (e.g., by re-folding a series of vectors (e.g., 1-dimensional arrays) that correspond to the secondary observations and that are used for the PCA into the initial 2-dimensional format). The origin of the difference between in groups A and B as can be seen in FIG. 5A may be shown by the re-folded loadings as shown in FIG. 5B. In FIG. 5B, the magnitude of the difference is shown by the white to black gradient. Black and white shows the area where the number of objects rises and decreases the most between both groups of conditions A and B, respectively. Thus, by displaying the loadings in their initial 2-dimensional format, it may be possible to localize the area where the population have varied between groups A and B.

Referring again to FIG. 2, after step S80, the exemplary process shown in FIG. 2 may end.

It is noted that, in the exemplary process shown in FIG. 2, the maximum number of dimensions (e.g., the number of parameters) used for constructing the master histogram is limited to two (see e.g., steps S20 to S50). The number of bins of the master histogram grows exponentially with the number of primary variables used to construct the master histogram. For example, in case of multidimensional histograms, the histogram bins may correspond to pixels for 2D histograms and to voxels for 3D histograms. Accordingly, for practical reasons, the maximum number of dimensions of the master histogram may be limited to two in some exemplary embodiments. Limiting the dimension of the master histogram to two may be advantageous for computing performance. Further, beyond 3 dimensions, a dimension reduction may be preferable also for visualisation purposes. In some other exemplary embodiments, however, more than two primary variables may be used for constructing a master histogram. While limiting the dimension of the master histogram may be preferable in order to limit the number of the secondary variables, the number of bins required for a master histogram may be considered as a parameter to be optimised and may depend on the resolution required to identify subpopulations of objects.

Further, although the exemplary process shown in FIG. 2 is described with reference to FIGS. 3, 4, 5A and 5B involving the exemplary primary dataset representing the result of a hypothetical experiment, it should be noted that the hypothetical experiment is referred to merely for the sake of facilitating understanding of the claimed subject-matter. As will be apparent from the exemplary applications described below, the method according to the present disclosure may be applied to a dataset including observations obtained by performing a physical, chemical and/or biological experiment.

Exemplary Application 1: Automated Gating

The method according to the present disclosure (e.g., the exemplary process as described above with reference to FIGS. 2 to 5B) may be applied to different types of data. One specific example of data to be analyzed may be data obtained by flow cytometry, as also stated above.

The most common data processing in flow cytometry may involve selection of areas corresponding to cells of interest. Such areas may be defined by an interval within the range(s) of values of one or more parameters measured for each object (e.g., cell or particle). This operation of selecting areas corresponding to the cells of interest may be referred to as "gating". Gating may be done on one axis corresponding to one parameter or on a multidimensional space. Gating is usually performed manually on some data acquired on reference samples. Then the selected area, called "gate", is applied as a mask on the data from samples where the cell populations size needs to be estimated. Manual gating may be time-consuming and require a highly qualified operator. For example, the operator may have to know where the cells of interest are, and which cluster corresponds to the expected sub population of cells. More specifically, for example, the operator may have to know how to differentiate cluster of dead cells from a cluster of live cells in a toxicological study.

Figure 6:
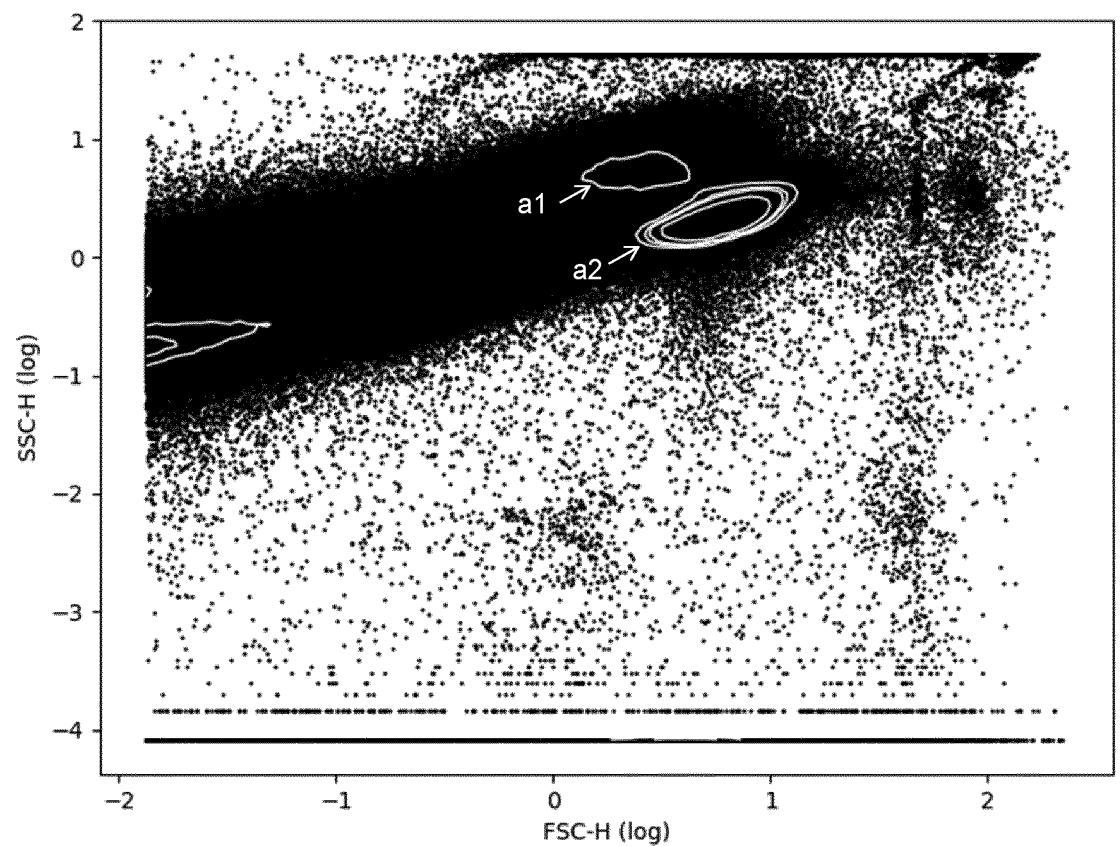
FIG. 6 shows an exemplary user interface representation of manual gating performed on results of a flow cytometry experiment.

FIG. 6 shows exemplary user interface representation of manual gating performed on results of a flow cytometry experiment. In FIG. 6, the white lines defining areas a1 and a2, respectively, are drawn by the operator in order to define where the dead and live cells are.

Automated gating methodology has been tentatively applied on such data. Examples of methods of automated gating may include, but are not limited to, k-Means clustering (see e.g., Luta G, "On extensions of k-means clustering for automated gating of flow cytometry data", Cytometry A. 2011 January; 79(1):3-5), flowMeans (see e.g., Aghaeepour N, Nikolic R, Hoos H H, Brinkman R R, "Rapid cell population identification in flow cytometry data", Cytometry A. 2011 January; 79(1):6-13), flowDensity (see e.g., Malek M, Taghiyar M J, Chong L, Finak G, Gottardo R, Brinkman R R, "flowDensity: reproducing manual gating of flow cytometry data by automated density-based cell population identification", Bioinformatics. 2015 Feb. 15; 31(4):606-7). Existing methods of automated gating, however, have been applied only on data corresponding to one sample at a time, and not simultaneously to all the samples.

In contrast, with the method according to the present disclosure, data corresponding to more than one sample can be processed simultaneously.

As a specific example, analysis on a toxicological assay using flow cytometry will be described here. In this example, the number of living cells may decrease with time according to the dose of a compound. In order to calibrate such an experiment, a set of positive and negative controls may be used. For instance, the second histograms (in other words, secondary observations) generated by performing steps S10 to S60 of the exemplary process shown in FIG. 2 may be analysed using pattern recognition (e.g., in step S80 of FIG. 2). The bins of the master and second histograms (in other words, secondary variables) that show a systematic decrease between negative and positive controls can then be considered as an area of the histogram corresponding to the living cells. It may then be straightforward to automatically generate a mask that counts objects within this area of the histogram. The cells (e.g., corresponding to the primary observations) within the area defined by this mask can then be counted for the other experiments that are related to different compounds, concentration and/or toxicity, etc.

The exemplary process shown in FIG. 2 with respect to the data in this example can be performed without any input from the user.

The following provides details of a flow cytometry experiment and data analysis performed for this particular example:

The flow cytometry experiment acquired 12 parameters for each particle analyzed from a 96-well plate containing a set positive and negative controls as well as series of compounds at different concentration. Around 750,000 events (e.g., cells or other particles) have been detected. The measured parameters are side light scattering, forward light scattering, four fluorescence channels. Each of these parameters are estimated in two different ways from their initial signal, using a known method for processing signals in flow cytometry.

Figure 7A:
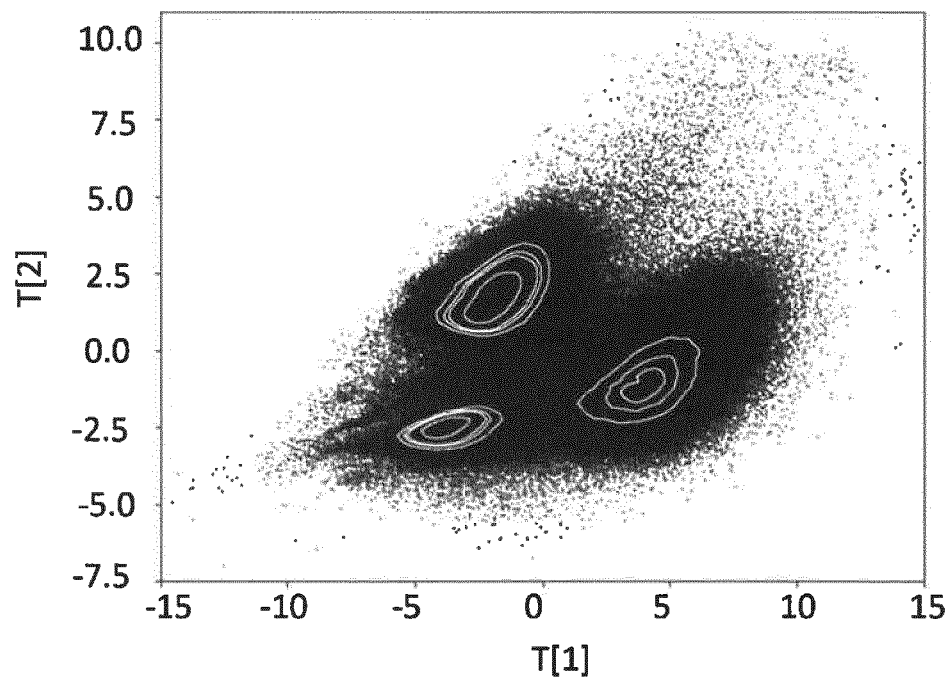
FIG. 7A shows a score plot of the first two principal components of exemplary flow cytometry data.

The dimensionality of a table containing the data is around 750,000 rows and 12 columns. This is considered as the primary dataset. The dimension of the table has been reduced to a table with the same number of rows (~750,000) and only 2 columns, using principal component analysis where only the two first components have been retained. FIG. 7A shows the score plot of this PGA. FIG. 7A shows three main clusters of events. At this point, no information is given about the well content. The reduced table is also considered as a primary dataset because the reduced table describes the primary observations with two new variables that can also be considered as primary variables.

Figure 7B:
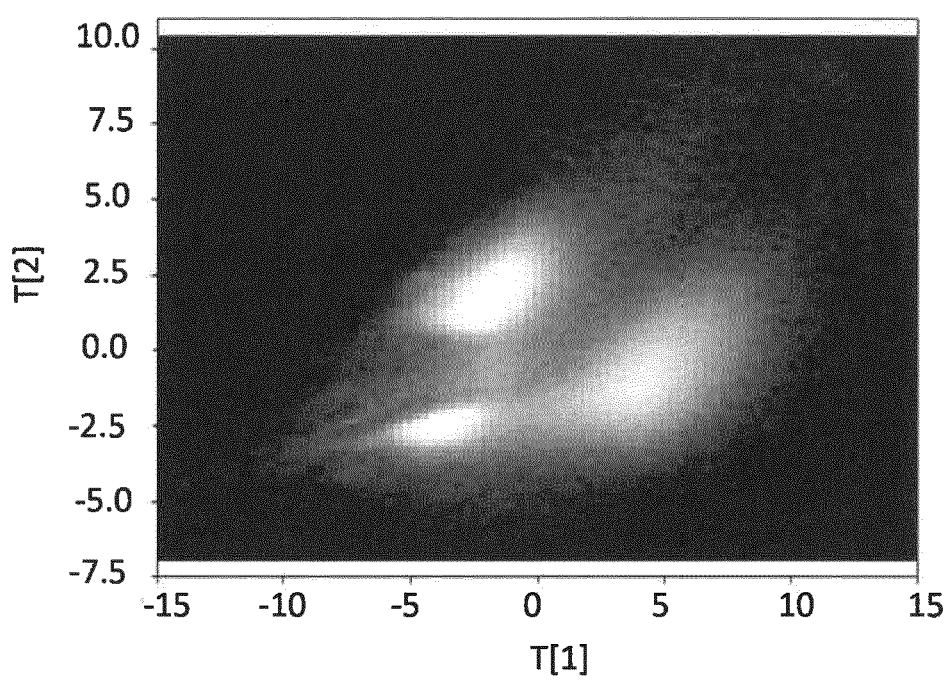
FIG. 7B shows a 2D histogram constructed from the scores shown in FIG. 7A.

A two-dimensional histogram is then built based on the scores of the two first principal components (e.g., the reduced primary dataset). FIG. 7B shows a representation of this 2D histogram. The histogram shown in FIG. 7B is considered as the master histogram. The master histogram has 100×100 bins that are considered as the secondary variables. In FIG. 7B, the bins (e.g., pixels) have intensities in a grayscale according to number of events in that bin. The darker the bin is, the lower the density is. Thus, the black bins have the lowest density and the white bins have the highest density.

The bins of the master histogram (in other words, the secondary variables) are used to create a separate histogram (in other words, second histogram or secondary observation) for all individual wells of the 384-well plate. In this particular example, 8 different compounds, each at 12 different concentrations are used. Three wells are prepared for each condition. For positive and negative controls, 96 wells are also prepared. For the negative controls (48 wells), a solution containing the solvent used to prepare the compounds is added. For the positive controls (48 wells), a reference toxin is used in order to kill all the cells.

Each 2D second histogram can then be described by a set of 10,000 values corresponding to the bins of the master histogram (thus, the 10,000 values may be considered as values of the secondary variables).

From the data of the 384-well plate, a table of 96 rows and 10,000 columns is obtained. Each row corresponds to a secondary observation for the wells of a positive or negative control. Each column corresponds to a master histogram bin.

A partial least square discriminant analysis (PLS DA) is performed on the secondary dataset to determine which bins (in other words, secondary variables) show the most difference between the positive and negative controls.

Figure 8:
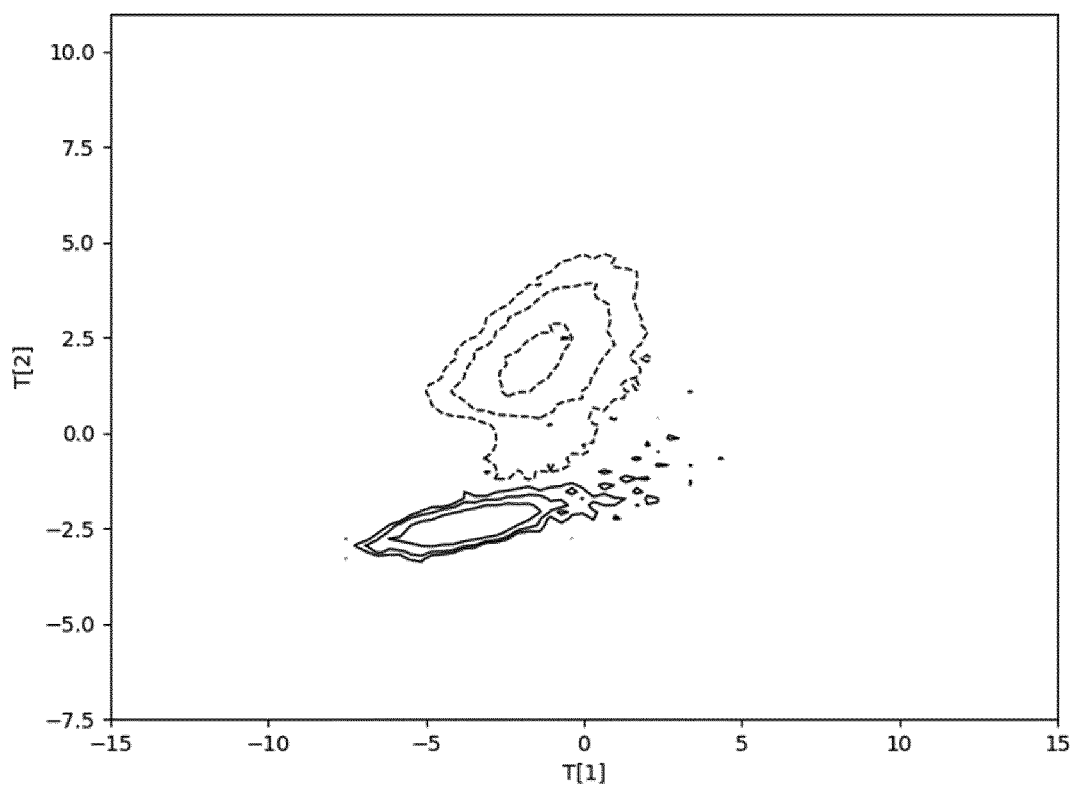
FIG. 8 shows loadings resulting from a data analysis process on exemplary secondary observations obtained from the exemplary flow cytometry data, shown in the format the 2D master histogram of FIG. 7B.

The loadings of the PLS-DA are then displayed in the initial master 2D histogram to localize the bins that are related to a rise in dead cells and decrease in live cells. FIG. 8 shows such loadings (e.g., the loadings of the PLS-DA after being refolded) in the format of the initial master 2D histogram. In FIG. 8, the regions defined by solid lines correspond to the area where live cells are higher than dead cells in negative controls than positive controls. The areas corresponding to the live and dead cells can then be defined and a mask based on the bins of the 2D master histogram can be built accordingly.

Figure 9A:
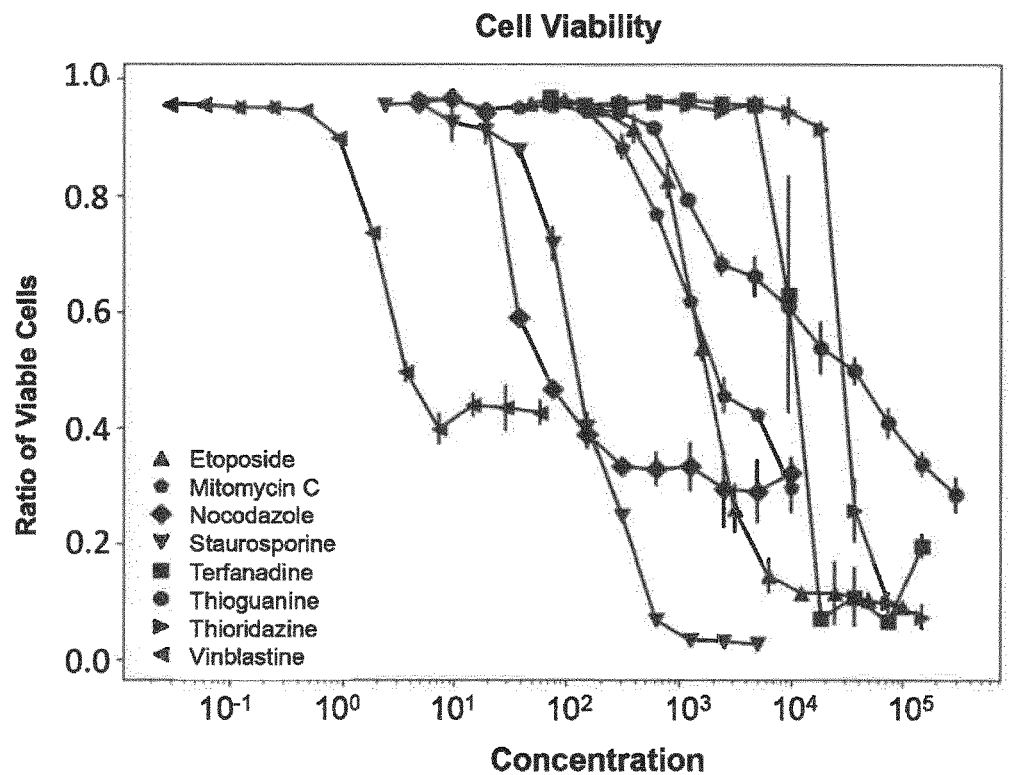
FIG. 9A shows exemplary results obtained from gating performed with a method according to the present disclosure.
Figure 9B:
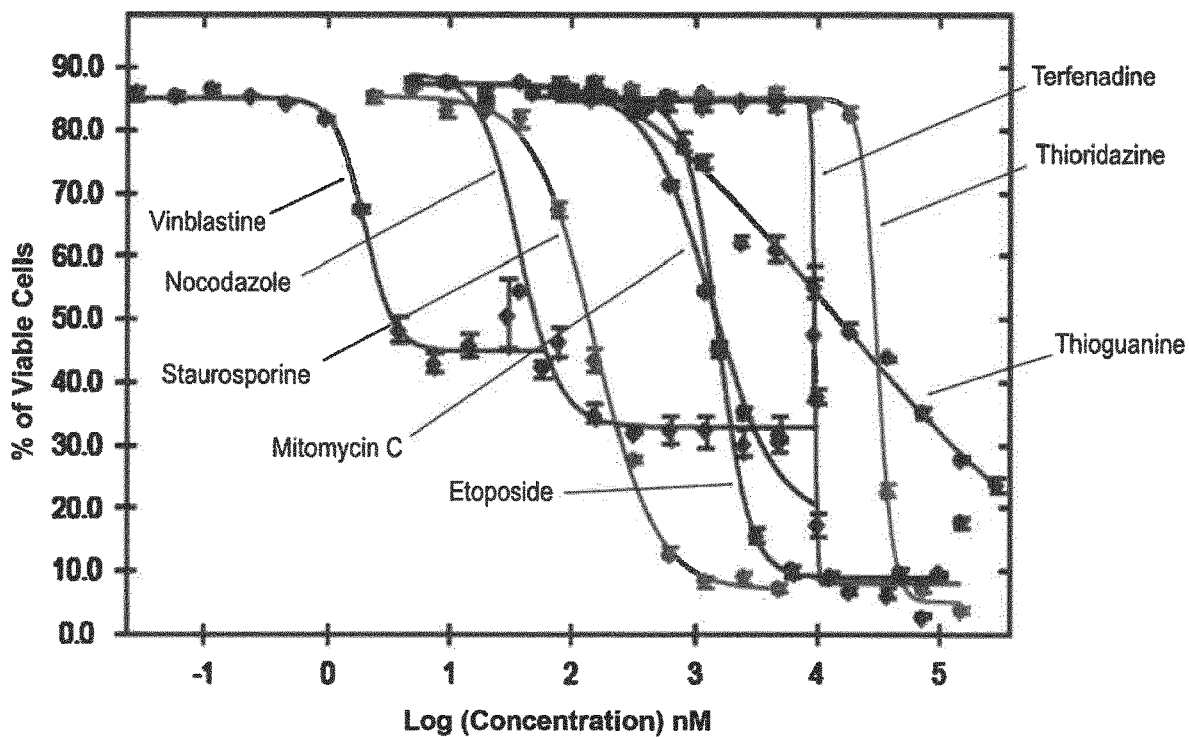
FIG. 9 shows exemplary results obtained from manual gating.

All the data from the other wells may be projected onto the mask corresponding to the live cells. The results can then be plotted as they are normally plotted after manual gating. FIG. 9A shows the results obtained for automated gating by performing the exemplary process on the specific example of the flow cytometry data as described above. FIG. 9B shows results obtained after manual gating.

Exemplary Application 2: Cell Shape Evolution

Another specific example of data to be analyzed with the method according to the present disclosure may be an automated cell segmentation dataset obtained from microscopic images of cells. For this example, the second histograms (in other words, secondary observations) from an automated cell segmentation dataset (that may be considered as the primary dataset) are used to follow the relative evolution of the cellular shape when the cells are subject to different treatments. In this case, the set of kernel density estimation curve obtained from the second histograms (in other words, secondary observations) can be compared using principal component analysis (PCA). The scores of the principal components can then show the relative evolution of the cell population with time. Then in order to characterise these differences further in terms of cellular shapes, the images corresponding to the secondary observations displaying the most differences could be isolated from the hundreds of images potentially acquired. This may have the benefit of helping biologist to automatically select, from hundreds of images, images that most represent the biological variation in the experiment.

The following provides details of cell segmentation and data analysis performed for this particular example:

The data from the cell segmentation are obtained by measuring cellular morphological features from microscopic images (e.g., area, perimeter, circularity, solidity, feret, etc.). Modern image processing methods can allow measurement of these features from many thousands of cells. The resulting primary dataset may be a table containing hundreds of thousands of rows that may be considered as the primary observations and each row corresponds to each cell. In this particular example, the table has 10 columns that may be considered as the primary variables. The rows of data comprised in the table are derived from hundreds of microscopic images acquired at different time points and correspond to different treatments.

Figure 10:
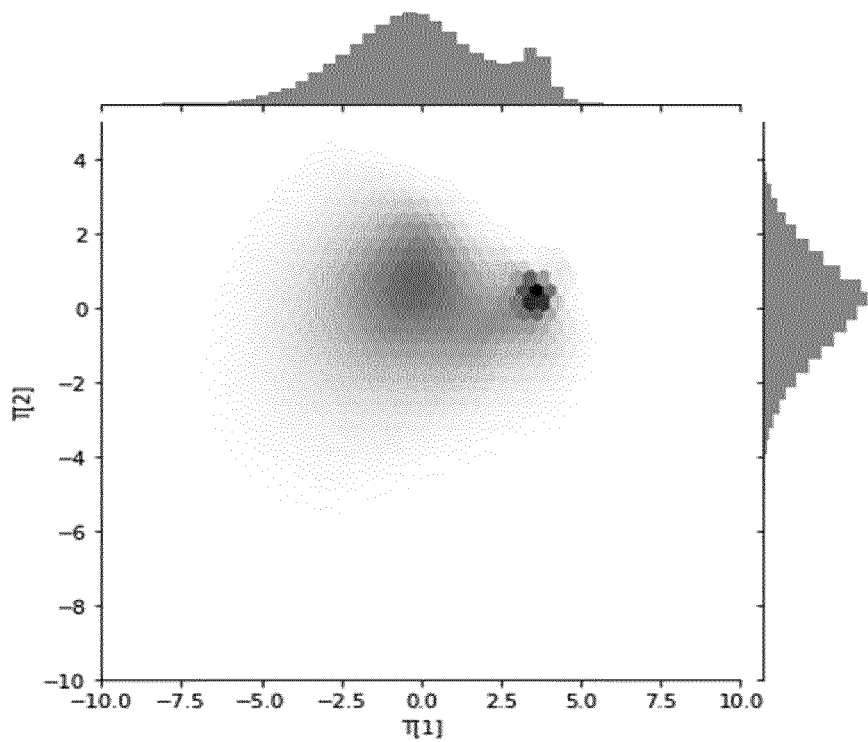
FIG. 10 shows an exemplary score plot of the first two principal components of exemplary cell segmentation data.

A dimension reduction process (e.g., PCA) is applied to reduce the number of primary variables and to obtain a new set of primary variables that can be used to construct the master histogram. FIG. 10 shows the scores of the two first principal components of the exemplary cell segmentation data. The two first principal components may be considered as the new primary variables for constructing the master histogram. The bins of the master histogram may be considered as the secondary variables.

As can be seen from FIG. 10, the first principal component is the component that best captures the difference between sub-populations of cells. Hence, in this particular example, the master histogram is built from the scores of this component only. Accordingly, the bins of the 1D master histogram are the secondary variables in this particular example.

The data of each image is then projected on the bins corresponding to the first principal component (in other words, the secondary variables). As a result, a set of secondary observations are obtained, each secondary observation corresponding to one microscopic image.

Figure 11:
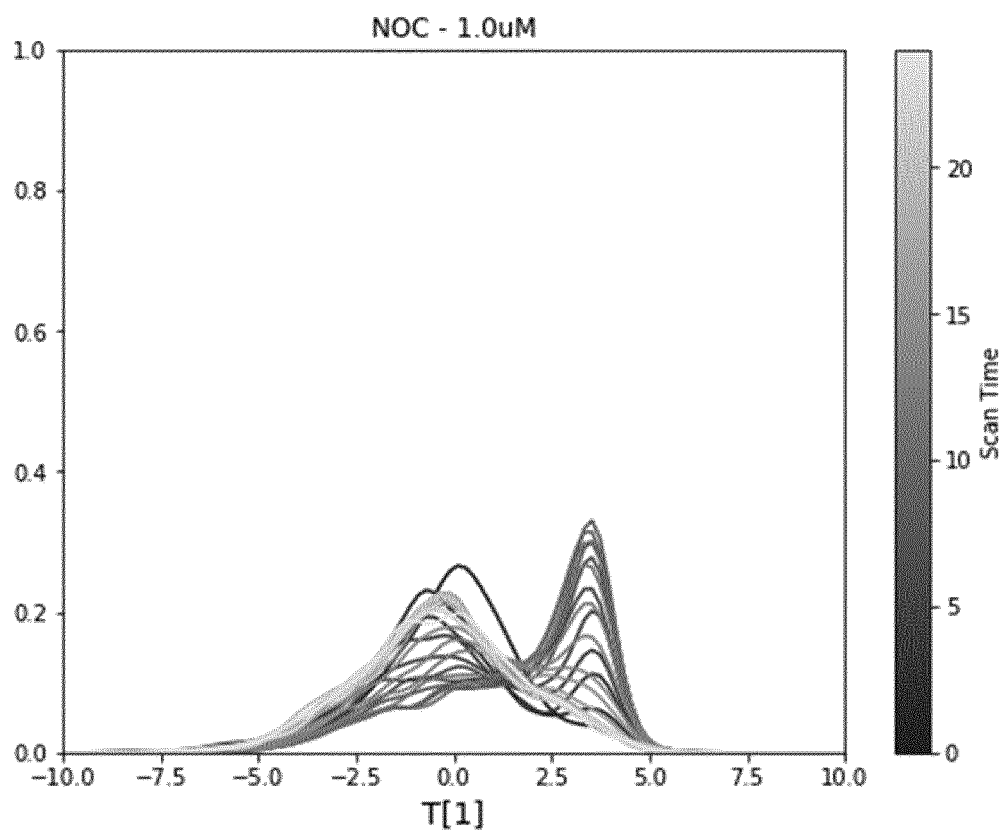
FIG. 11 shows exemplary time evolution of kernel density estimate of histograms corresponding to the images of the treatment by NOC at 1.0 μM.

A kernel density estimation approach has been applied on the individual histograms (in other words, the secondary observations). The resulting curves can then be displayed on the same figure for visualization. FIG. 11 shows an example of the time evolution of these curves. More specifically, FIG. 11 shows time evolution of the kernel density estimate of the second histograms corresponding to the images of the treatment by 5,7-dihydroxy-8-nitrochrysin (NOC) at 1.0 μM.

Figure 12:
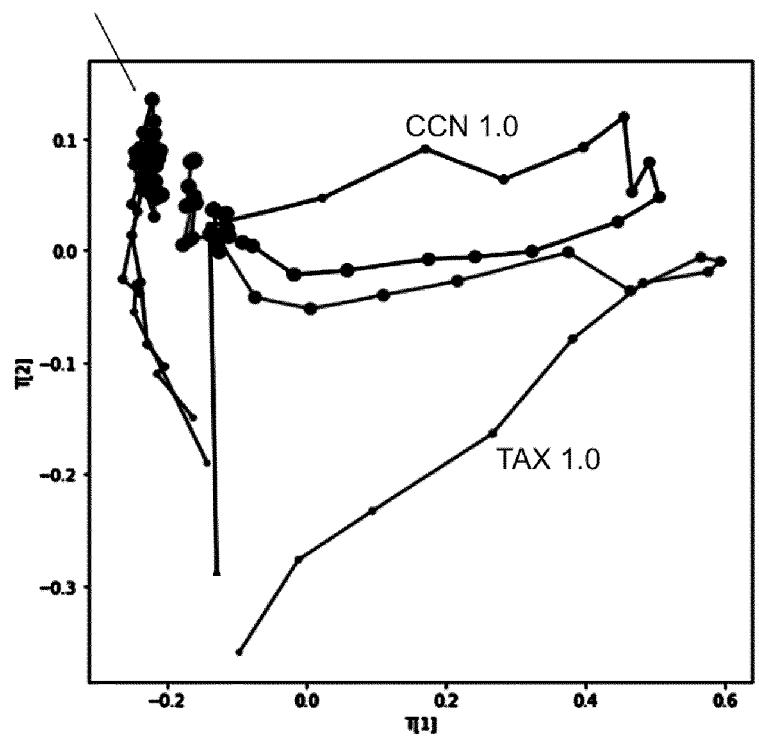
FIG. 12 shows an exemplary score plot of the first two principal components of the histograms corresponding to images acquired at different time points for different treatments.

Finally, PCA has been performed on a subset of secondary observations for comparison of the time evolution. FIG. 12 shows the two first principal components. More specifically, FIG. 12 shows a score plot of the first two principal components of the second histograms corresponding to microscopic images acquired at different time points (the size of the point rises with time) for different treatments. FIG. 12 clearly shows the different trajectories. Since each point corresponds to one image, it may be straightforward to select images that show the most contrast for further interpretation.

Hardware Configuration

Figure 13:
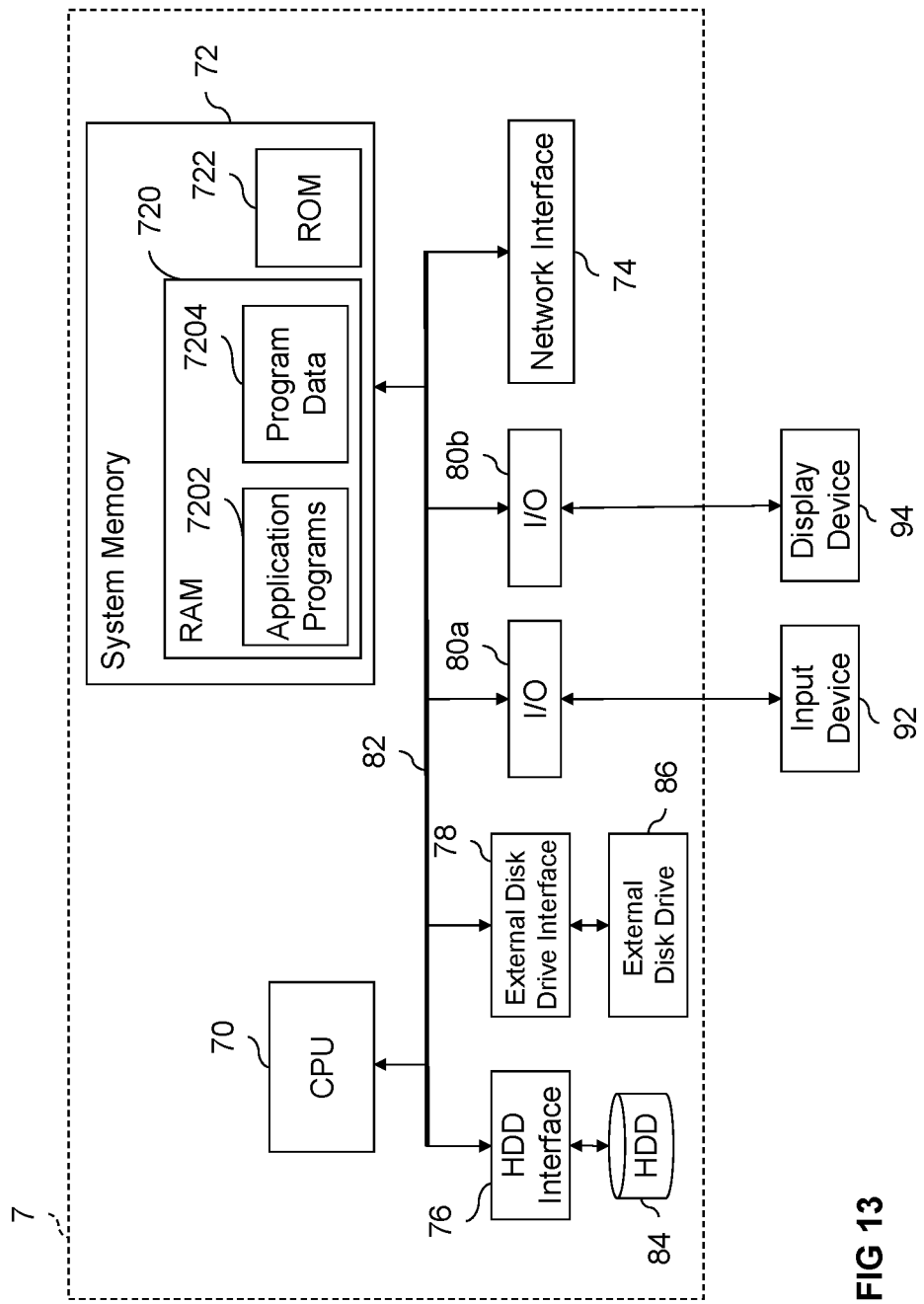
FIG. 13 shows an exemplary hardware configuration of a computer that may be used to implement at least a part of a system according to the present disclosure.

FIG. 13 shows an exemplary hardware configuration of a computer that may be used to implement at least a part of the system as described above. For example, the computing device 20 shown in FIG. 1 may be implemented with the computer 7 shown in FIG. 13. The computer 7 shown in FIG. 13 includes a central processing unit (CPU) 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the exemplary method and its variations as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or M 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 13, the computer 7 may further be connected to a printer and/or an imaging device such as a camera, via corresponding I/O interfaces and the system bus 82.

In addition or as an alternative to an implementation using a computer 7 as shown in FIG. 13, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A computer-implemented method for flow cytometry comprising:
    performing a flow cytometry experiment on a plurality of samples to obtain initial observations;
    obtaining a plurality of first observations derived from the initial observations, each one of the plurality of first observations including one or more values of one or more first parameters, the plurality of first observations being grouped into a plurality of groups, the one or more values having been:
        measured during the flow cytometry experiment, or
        derived from a result of the flow cytometry experiment;
    constructing a first histogram using the values of at least one of the one or more first parameters, included in the plurality of first observations across the plurality of samples;
    constructing, for each one of the plurality of groups, a second histogram having bins corresponding to bins of the first histogram, wherein each one of the bins of the second histogram includes a count of the first observations, among the first observations that belong to the one of the plurality of groups, having one or more values corresponding to the one of the bins for the at least one of the one or more first parameters;
    outputting the second histograms constructed for the plurality of groups; and
    performing a multivariate data analysis process on a data set representing the second histograms as second observations, wherein each one of the second observations corresponds to one of the second histograms, the data set represents the plurality of samples processed collectively, and each one of the second observations has the count of each bin of the one of the second histograms as a value of a second parameter,
    wherein the multivariate data analysis process comprises one or more of:
        multivariate pattern recognition using principal component analysis,
        multivariate regression, or
        multivariate time series analysis;
    wherein:
    the values of the one or more first parameters included in the plurality of first observations are obtained by performing a dimension reduction process on the initial observations corresponding to the plurality of first observations, each one of the initial observations including values of a plurality of initial parameters, wherein a number of the plurality of initial parameters is greater than a number of the one or more first parameters;
    each one of the initial observations corresponds to a cell or a particle observed during the flow cytometry experiment, and there are at least two thousand initial observations;
    the plurality of initial parameters include forward-scattered light, side-scattered light and/or at least one fluorescence signal that can be measured during the flow cytometry experiment;
    the plurality of groups relate to different sets of experimental conditions under which the initial observations have been obtained and the first observations belonging to a same one of the plurality of groups correspond to the initial observations obtained under a same one of the different sets of experimental conditions;
    the multivariate data analysis process comprises a partial least squares discriminant analysis; and
    the method further comprises:
        determining, according to a result of the multivariate data analysis process, one or more second parameters that can indicate existence of one or more living cells;
        with the one or more second parameters, generating a mask that counts objects within an area of the first histogram; and
        with the mask, counting cells within the area of the first histogram;
    wherein data corresponding to the plurality of samples is processed simultaneously as part of a toxicological assay using flow cytometry.

2. The method according to claim 1, wherein the dimension reduction process is principal component analysis.

3. The method according to claim 1, wherein the flow cytometry experiment comprises performing an automated cell segmentation method on microscopic images of cells;
    wherein each one of the initial observations corresponds to an object identified as a cell while performing the automated cell segmentation method;
    wherein the plurality of initial parameters include morphological measurements carried out on the microscopic images while performing the automated cell segmentation method; and
    wherein each one of the plurality of groups corresponds to one of the microscopic images and the first observations belonging to a same one of the plurality of groups correspond to the initial observations that have been obtained from a same one of the microscopic images.

4. A non-transitory computer program product comprising computer-readable instructions that, when loaded and run on a computer, cause the computer to perform a method comprising:

measuring initial observations via a flow cytometry experiment performed on a plurality of samples;

obtaining a plurality of first observations derived from the initial observations, each one of the plurality of first observations including one or more values of one or more first parameters, the plurality of first observations being grouped into a plurality of groups, the one or more values having been:
measured during the flow cytometry experiment, or
derived from a result of the flow cytometry experiment;

constructing a first histogram using the values of at least one of the one or more first parameters, included in the plurality of first observations across the plurality of samples;

constructing, for each one of the plurality of groups, a second histogram having bins corresponding to bins of the first histogram, wherein each one of the bins of the second histogram includes a count of the first observations, among the first observations that belong to the one of the plurality of groups, having one or more values corresponding to the one of the bins for the at least one of the one or more first parameters;

outputting the second histograms constructed for the plurality of groups; and performing a multivariate data analysis process on a data set representing the second histograms as second observations, wherein each one of the second observations corresponds to one of the second histograms, the data set represents the plurality of samples processed collectively, and each one of the second observations has the count of each bin of the one of the second histograms as a value of a second parameter, wherein the multivariate data analysis process comprises one or more of:
multivariate pattern recognition using principal component analysis,
multivariate regression, or
multivariate time series analysis;

wherein:
the values of the one or more first parameters included in the plurality of first observations are obtained by performing a dimension reduction process on the initial observations corresponding to the plurality of first observations, each one of the initial observations including values of a plurality of initial parameters, wherein a number of the plurality of initial parameters is greater than a number of the one or more first parameters;

each one of the initial observations corresponds to a cell or a particle observed during the flow cytometry experiment, and there are at least two thousand initial observations;

the plurality of initial parameters include forward-scattered light, side-scattered light and/or at least one fluorescence signal that can be measured during the flow cytometry experiment;

the plurality of groups relate to different sets of experimental conditions under which the initial observations have been obtained and the first observations belonging to a same one of the plurality of groups correspond to the initial observations obtained under a same one of the different sets of experimental conditions;

the multivariate data analysis process comprises a partial least squares discriminant analysis; and the method further comprises:
determining, according to a result of the multivariate data analysis process, one or more second parameters that can indicate existence of one or more living cells;
with the one or more second parameters, generating a mask that counts objects within an area of the first histogram; and
with the mask, counting cells within the area of the first histogram;

wherein data corresponding to the plurality of samples is processed simultaneously as part of a toxicological assay using flow cytometry.

5. A system for flow cytometry comprising:
a storage medium; and
a processor configured to:
perform a flow cytometry experiment on a plurality of samples to obtain initial observations;
obtain a plurality of first observations derived from the initial observations, each one of the plurality of first observations including one or more values of one or more first parameters, the plurality of first observations being grouped into a plurality of groups, the one or more values having been:
measured during the flow cytometry experiment, or
derived from a result of the flow cytometry experiment;
construct a first histogram using the values of at least one of the one or more first parameters, included in the plurality of first observations;
construct, for each one of the plurality of groups, a second histogram having bins corresponding to bins of the first histogram, wherein each one of the bins of the second histogram includes a count of the first observations, among the first observations that belong to the one of the plurality of groups, having one or more values corresponding to the one of the bins for the at least one of the one or more first parameters; and
store, in the storage medium, the second histograms constructed for the plurality of groups; and
perform a multivariate data analysis process on a data set representing the second histograms as second observations, wherein each one of the second observations corresponds to one of the second histograms and has the count of each bin of the one of the second histograms as a value of a second parameter, wherein the multivariate data analysis process comprises one or more of:
multivariate pattern recognition using principal component analysis,
multivariate regression, or
multivariate time series analysis;

wherein:
the values of the one or more first parameters included in the plurality of first observations are obtained by performing a dimension reduction process on the initial observations corresponding to the plurality of first observations, each one of the initial observations including values of a plurality of initial parameters, wherein a number of the plurality of initial parameters is greater than a number of the one or more first parameters, and wherein the dimension reduction process comprises principal component analysis;

each one of the initial observations corresponds to a cell or a particle observed during the flow cytometry experiment, and there are at least two thousand initial observations;

the plurality of initial parameters include forward-scattered light, side-scattered light and/or at least one fluorescence signal that can be measured during the flow cytometry experiment;

the plurality of groups relate to different sets of experimental conditions under which the initial observations have been obtained and the first observations belonging to a same one of the plurality of groups correspond to the initial observations obtained under a same one of the different sets of experimental conditions;

the multivariate data analysis process comprises a partial least squares discriminant analysis; and the processor is further configured to:
 determine, according to a result of the multivariate data analysis process, one or more second parameters that can indicate existence of one or more living cells;
 with the one or more second parameters, generate a mask that counts objects within an area of the first histogram; and
 with the mask, count cells within the area of the first histogram;

data corresponding to the plurality of samples is processed simultaneously as part of a toxicological assay using flow cytometry.

6. The system according to claim 5, wherein the initial observations are obtained by performing an automated cell segmentation method on microscopic images of cells;

wherein each one of the initial observations corresponds to an object identified as a cell while performing the automated cell segmentation method;

wherein the plurality of initial parameters include morphological measurements carried out on the microscopic images while performing the automated cell segmentation method; and wherein each one of the plurality of groups corresponds to one of the microscopic images and the first observations belonging to a same one of the plurality of groups correspond to the initial observations that have been obtained from a same one of the microscopic images.

* * * * *